United States Patent
Sakanobe et al.

(10) Patent No.: US 9,653,906 B2
(45) Date of Patent: May 16, 2017

(54) OVERCURRENT DETECTION CIRCUIT, INVERTER, COMPRESSOR, AND AIR-CONDITIONING MACHINE, AND ADJUSTING METHOD FOR ADJUSTING OVERCURRENT DETECTION CIRCUIT

(71) Applicant: Mitsubishi Electric Corporation, Chiyoda-ku, Tokyo (JP)

(72) Inventors: Kazunori Sakanobe, Tokyo (JP); Koichi Arisawa, Tokyo (JP); Futoshi Okawa, Tokyo (JP); Masato Handa, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/223,635

(22) Filed: Jul. 29, 2016

(65) Prior Publication Data

US 2016/0336729 A1 Nov. 17, 2016

Related U.S. Application Data

(63) Continuation of application No. 13/058,691, filed as application No. PCT/JP2008/066151 on Sep. 8, 2008, now abandoned.

(51) Int. Cl.
*H02H 3/08* (2006.01)
*H02H 3/00* (2006.01)
(Continued)

(52) U.S. Cl.
CPC .............. *H02H 3/08* (2013.01); *F04B 35/04* (2013.01); *F04B 51/00* (2013.01); *F04C 28/28* (2013.01);
(Continued)

(58) Field of Classification Search
CPC .......... H02H 3/08; H02H 3/006; H02H 7/122; G01K 15/005; G01K 7/36; F04C 28/28; F04C 29/0085; F04B 35/04; F04B 51/00
(Continued)

(56) References Cited

U.S. PATENT DOCUMENTS 4,788,620 A 11/1988 Scott
5,936,288 A 8/1999 Tsuchida et al.
(Continued)

FOREIGN PATENT DOCUMENTS

JP  5-328733 A  12/1993
JP  11-325657 A  11/1999
(Continued)

OTHER PUBLICATIONS

International Search Report (PCT/ISA/210) issued on Oct. 7, 2008, by Japanese Patent Office as the International Searching Authority for International Application No. PCT/JP2008/66151.
(Continued)

*Primary Examiner* — Thienvu Tran
*Assistant Examiner* — Lucy Thomas
(74) *Attorney, Agent, or Firm* — Buchanan Ingersoll & Rooney PC

(57) ABSTRACT

A current detection device for detecting an electric current flowing through an inverter, an overcurrent level generation device for generating an abnormality judgment reference value, an overcurrent detection device for generating an interruption signal to the inverter on the basis of an output of the current detection device and the abnormality judgment reference value, and an adjusting apparatus for correcting the abnormality judgment reference value of the overcurrent level generation device on the basis of the output at a time when a constant electric current is applied to the current detection device are provided. The overcurrent
(Continued)

level generating device is provided with one or a plurality of resistance value adjusting sections, and generates the abnormality judgment reference value in correspondence to a resistance value of the resistance value adjusting section. The adjusting apparatus performs a zapping operation by means of applying a reverse-bias to a zener diode, and corrects the abnormality judgment reference value.

12 Claims, 8 Drawing Sheets

(51) Int. Cl.
  *H02H 7/08*  (2006.01)
  *F04B 35/04*  (2006.01)
  *F04B 51/00*  (2006.01)
  *F04C 28/28*  (2006.01)
  *F04C 29/00*  (2006.01)
  *G01K 7/36*  (2006.01)
  *G01K 15/00*  (2006.01)
  *H02H 7/122*  (2006.01)

(52) U.S. Cl.
  CPC ............ *F04C 29/0085* (2013.01); *G01K 7/36* (2013.01); *G01K 15/005* (2013.01); *H02H 3/006* (2013.01); *H02H 7/0833* (2013.01); *H02H 7/122* (2013.01); *F04B 2203/0201* (2013.01); *F04C 2240/403* (2013.01)

(58) Field of Classification Search
  USPC .................................. 361/18, 42, 93.1, 93.9
  See application file for complete search history.

(56) References Cited

U.S. PATENT DOCUMENTS

| | | | |
|---|---|---|---|
| 7,481,885 | B2 | 1/2009 | Shimizu et al. |
| 7,609,498 | B2 | 10/2009 | Iimura et al. |
| 2003/0117753 | A1 | 6/2003 | Kato et al. |
| 2003/0227730 | A1 | 12/2003 | Iimura et al. |
| 2005/0015968 | A1 | 1/2005 | Shinjo et al. |
| 2006/0044045 | A1 | 3/2006 | Sakata et al. |
| 2007/0014065 | A1 | 1/2007 | Iimura et al. |
| 2007/0072394 | A1 | 3/2007 | Shimizu et al. |

FOREIGN PATENT DOCUMENTS

| | | | |
|---|---|---|---|
| JP | 2000-023485 A | 1/2000 |
| JP | 3147488 B2 | 1/2001 |
| JP | 2002-343441 A | 11/2002 |
| JP | 2003-319546 A | 11/2003 |
| JP | 2005-043328 A | 2/2005 |
| JP | 2006-067660 A | 3/2006 |

OTHER PUBLICATIONS

Office Action from Chinese Patent Office dated Apr. 1, 2013, issued in corresponding Chinese Patent Application No. 200880131012.0, with an English translation thereof. (18 pages).

Office Action from Chinese Patent Office dated Apr. 23, 2014, issued in corresponding Chinese Patent Application No. 200880131012.0, with English translation thereof. (5 pages).

Office Action from Australian Government IP Australia dated Jun. 12, 2013, issued in corresponding Australian Patent Application No. 2008361295. (4 pages).

Extended European Search Report dated Nov. 21, 2012, issued by the European Patent Office in the corresponding European Application No. 08810206.6. (6 pages).

Office Action (Patent Examination Report No. 1) dated Dec. 4, 2012, issued by the Australian Patent Office in the corresponding Australian Patent Application No. 2008361295. (3 pages).

Office Action from Japanese Patent Office dated Feb. 12, 2013, issued in corresponding Japanese Patent Appln. No. 2010-527641, with English translation thereof (4 pages).

Office Action from the Chinese Patent Office dated Oct. 31, 2014, issued in corresponding Chinese Application No. 200880131012.0, with English translation thereof (6 pages).

Office Action from Chinese Patent Office dated Nov. 5, 2013, issued in corresponding Chinese Patent Application No. 200880131012.0, with English translation thereof (8 pages).

(a)　　　(b)　　　(c)

OVERCURRENT DETECTION CIRCUIT, INVERTER, COMPRESSOR, AND AIR-CONDITIONING MACHINE, AND ADJUSTING METHOD FOR ADJUSTING OVERCURRENT DETECTION CIRCUIT

TECHNICAL FIELD

The present invention relates to an overcurrent detection circuit for preventing an electric current flowing through an inverter from becoming excessive, an inverter, a compressor, and an air-conditioning machine provided therewith, and to an adjusting method for adjusting the overcurrent detection circuit.

BACKGROUND ART

Hitherto, as a technology for adjusting a detection level of an overcurrent detection circuit of an inverter, for example, a technology in which a first pad connected to a detection voltage from an overcurrent detection resistor, a second pad connected to a detection voltage from an amplifier, and a third pad connected to a voltage-dividing resistor are provided in the vicinity of a current detection terminal, and the connection between the current detection terminal and a bonding wire of each pad allows switching between a plurality of overcurrent protection devices, is proposed (for example, refer to the Patent Document 1).

Further, as a method for correcting a detection error of the current, for example, a method in which an error-generating device generating a ratio between a detection value obtained from an amplifier upon causing a constant current to flow through a current detection resistor, and a previously set reference value, and a correction device for correcting a current command value of a current controller on the basis of the ratio obtained from the error-generating device are provided, is proposed (for example, refer to the Patent Document 2).

Furthermore, as a device for adjusting the overcurrent detection level, for example, a semiconductor device including a terminal for leading out a line of a reference voltage for comparison outward so that the reference voltage for comparison can be varied by means of a resistor connected from the outside is proposed (for example, refer to the Patent Document 3).

[Patent Document 1] Japanese Unexamined Patent Application Publication No. 2003-319546 (claim 1)
[Patent Document 2] Japanese Patent No. 3147488 (claim 1)
[Patent Document 3] Japanese Unexamined Patent Application Publication No. 2006-067660 (claim 1)

DISCLOSURE OF INVENTION

Problems to be Solved by the Invention

In an overcurrent detection circuit of an inverter, there has been a problem in which an error occurs due to fluctuation of the resistor used for a circuit or of a power supply voltage, in a reference value of an abnormality judgment (hereinafter also referred to as overcurrent level) for judging an abnormality of an electric current.

Further, due to the error, there has been a problem that a reduction of an operation range of the inverter, a lowering of a reliability of a protecting operation, and a large sizing of a circuit, an increase of a cost, a lowering of efficiency, or the like occur due to a increase of a maximum current of a load.

In the aforementioned technology described in the Patent Document 1, an adjusting operation is performed by selecting a terminal to which a wire is connected, after the overcurrent level is confirmed. However, there has been a problem that an additional soldering process for a board is required and a processing cost increases.

Furthermore, in the aforementioned technology described in the Patent Document 2, the error of the overcurrent level is memorized using an EEPROM. However, the correction for the error using the EEPROM is limited to a case of varying the overcurrent level that is controlled by a microcomputer and therefore there has been a problem that the correction cannot be applied to, for example, a circuit requiring an adjustment by means of a variation of resistance.

Moreover, in the aforementioned technology described in the Patent Document 3, the overcurrent level is varied by means of an external resistor. However, there has been a problem that an error occurs in the overcurrent level due to fluctuation of the external resistor.

Further, as another method, it is also considerable to use a variable resistor for varying the resistance value. However, there has been a problem that the variable resistor has low reliability as a part because the same includes a sliding portion, and a part cost is high.

The present invention is made to solve the aforementioned problems, and a first object is to obtain an overcurrent detection circuit, an inverter, a compressor, and an air-conditioning machine, capable of reducing an error of an abnormality judgment reference value, and an adjusting method for adjusting the overcurrent detection circuit.

A second object is to obtain an overcurrent detection circuit, an inverter, a compressor, and an air-conditioning machine, in which the aforementioned adjustment for reducing the error of the abnormality judgment reference value can be easily performed after circuit parts are mounted, and an adjusting method for adjusting the overcurrent detection circuit.

Means for Solving the Problems

An overcurrent detection circuit with respect to the present invention is provided with a current detection device connected between a direct-current power source and an inverter in series therewith, for detecting an electric current flowing through the inverter, an overcurrent level generation device for generating an abnormality judgment reference value, an overcurrent detection device for generating an interruption signal to the inverter on the basis of an output of the current detection device and the abnormality judgment reference value, and an adjusting apparatus for correcting the abnormality judgment reference value of the overcurrent level generation device on the basis of the output at a time when a constant electric current is applied to the current detection device, wherein the overcurrent level generation device includes one or a plurality of resistance value adjusting sections having a fixed resistor and a zener diode connected to the fixed resistor in parallel therewith, and generates the abnormality judgment reference value in correspondence to a resistance value of the resistance value adjusting section, and the adjusting apparatus performs a zapping operation by means of applying a reverse-bias to the zener diode, and corrects the abnormality judgment reference value.

Advantages

Since the present invention corrects the abnormality judgment reference value of the overcurrent level generation device on the basis of an output at a time when a constant electric current is applied to the current detection device, an error of the abnormality judgment reference value can be reduced. Further, an adjustment for reducing the error of the abnormality judgment reference value can be easily performed after circuit parts are mounted.

REFERENCE NUMERALS

1 direct-current power supply, 2 inverter, 3 current detection device, 4 overcurrent level generation device, 5 overcurrent detection device, 6 adjusting apparatus, 7 permanent magnet-type synchronous electric motor, 7a rotor, 7b stator, 10 resistance value-adjusting section, 10a through 10f resistance value-adjusting section, 11 laser apparatus, 11b laser apparatus, 20 nonvolatile memory, 21 reader section, 22 D/A converter circuit, 23 temperature sensor, 24 temperature correction device, 29 single rotary compressor, 30 cylinder, 31 rolling piston, 32 shaft, 33 suction port, 34 discharge port, 35 vane, 310 outdoor unit, 312 air blower, 320 indoor unit

BEST MODES FOR CARRYING OUT THE INVENTION

First Embodiment

Figure 1:
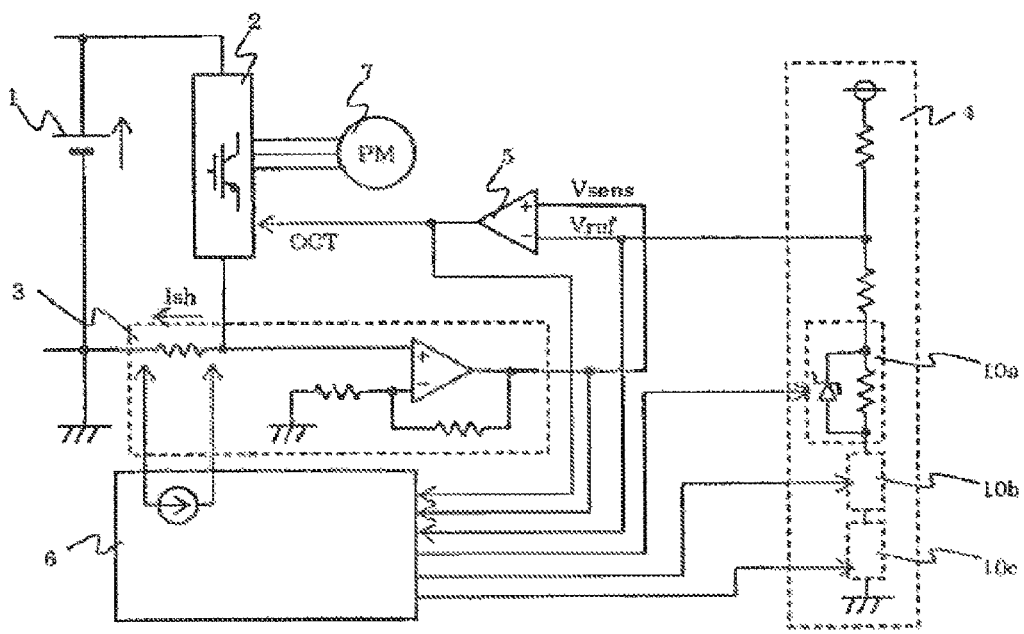
FIG. 1 is a construction view illustrating an overcurrent detection circuit according to a first embodiment of the present invention.

FIG. 1 is a construction view illustrating an overcurrent detection circuit according to the first embodiment of the present invention.

As illustrated in FIG. 1, the overcurrent detection circuit according to the present first embodiment is provided with a current detection device 3, an overcurrent level generation device 4, an overcurrent detection device 5, and an adjusting apparatus 6.

An inverter 2 allows a direct-current power supply 1 to be connected, generates an alternating-current power by means of switching a switching element, and drives a permanent magnet-type synchronous motor 7.

The current detection device 3 is serially connected between the direct-current power supply 1 and the inverter 2. The current detection device 3 includes a resistor for current detection (hereinafter also called as "detection section") and an amplifier circuit for amplifying a voltage that is generated from the resistor for the current detection. Further, the current detection device 3 detects an electric current flowing through a circuit formed of the direct-current power supply 1 and the inverter 2, and outputs an output voltage Vsens in correspondence to the electric current to the overcurrent detection device 5 and the adjusting apparatus 6.

The overcurrent level generation device 4 generates a reference voltage Vref serving as an abnormality judgment reference value of the output of the current detection device 3. Furthermore, the overcurrent level generation device 4 includes resistance value-adjusting sections 10a, 10b, and 10c (hereinafter, simply called as "resistance value-adjusting section 10" when not distinguished). The resistance value-adjusting section 10 includes a fixed resistor and a zener diode connected to the fixed resistor in parallel therewith.

The overcurrent level generation device 4 generates the reference voltage Vref in correspondence to a resistance value of the resistance value-adjusting section 10. By means of an operation, described later, a resistance value is adjusted by zapping in the resistance value-adjusting section 10.

The overcurrent detection device 5 generates an overcurrent detection signal OCT serving as an interruption signal for the inverter 2 on the basis of the output voltage Vsens inputted from the current detection device 3 and the reference voltage Vref inputted from the overcurrent level generation device 4, and outputs it to the inverter 2.

For example, the overcurrent detection device 5 outputs the overcurrent detection signal OCT when the output voltage Vsens reaches the reference voltage Vref or more.

The inverter 2 stops a switching element in the inverter 2 when the overcurrent detection signal OCT is inputted.

The adjusting apparatus 6 is connected to the current detection device 3, the overcurrent level generation device 4, and the overcurrent detection signal OCT. Further, the adjusting apparatus 6 includes a constant current source that allows a predetermined electric current to flow through the detection section of the current detection device 3. Furthermore, the adjusting apparatus 6 applies a reverse-bias current to the zener diode of the resistance value-adjusting section 10.

Moreover, by mean of an operation, described later, the adjusting apparatus 6 monitors the overcurrent detection signal OCT, and varies the resistance value of the resistance value-adjusting section 10 so that an overcurrent of the inverter 2 is detected with a previously determined accuracy.

Next, an adjusting operation for the reference voltage Vref of the overcurrent detection circuit in the present first embodiment will be explained using FIG. 2.

Figure 2:
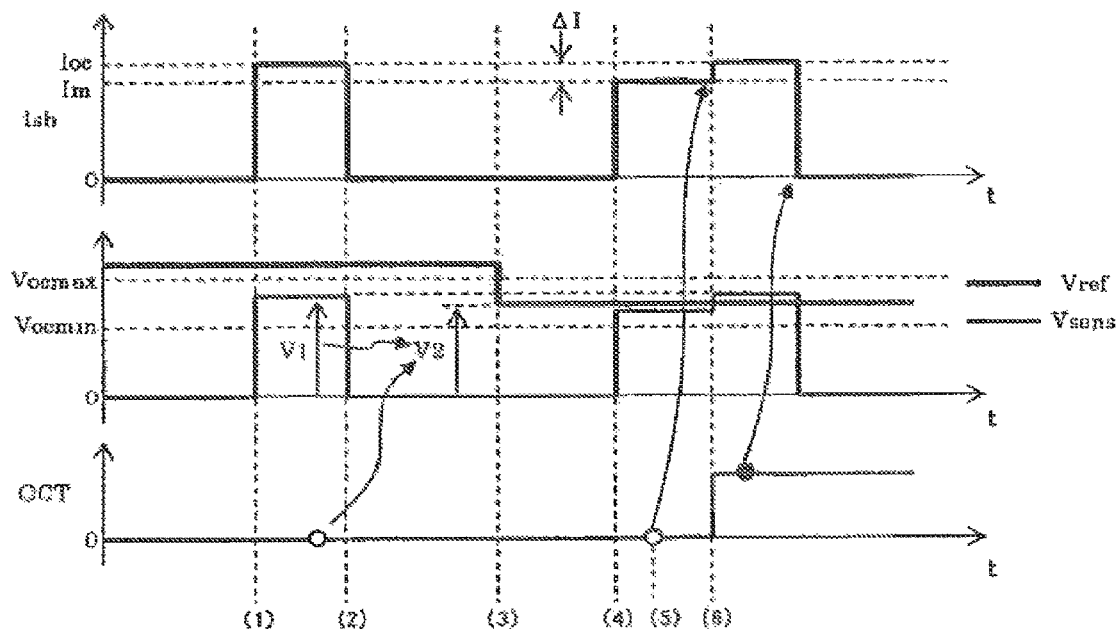
FIG. 2 is an operation-explanatory view for the overcurrent detection circuit according to the first embodiment of the present invention.

FIG. 2 is an operation-explanatory view for the overcurrent detection circuit according to the first embodiment of the present invention. In FIG. 2, Ish refers to a current in the detection section in the current detection device 3 (hereinafter referred to as "current in the detection section").

Ioc refers to a current value from which the overcurrent is detected.

Im refers to a maximum current value in a case where the overcurrent detection circuit is in a normal operating state.

Vocmax refers to a permissible maximum value of the output voltage of the current detection device 3 when the current value Ioc flows through the detection section.

Vocmin refers to a permissible minimum value of the output voltage of the current detection device 3 when the current value Ioc flows through the detection section.

Hereinafter, an adjusting operation for the reference voltage Vref will be explained along a time axis of FIG. 2.

Time (1)

Firstly, the adjusting apparatus 6 applies the current value Ioc, from which the overcurrent is detected, to the detection section of the current detection device 3.

Thereafter, the adjusting apparatus 6 observes an output voltage Vsens of the current detection device 3, and obtains an output voltage V1 at the time when the current value Ioc is applied.

Then, the adjusting apparatus 6 confirms whether the output voltage V1 is within a permissible value. That is, the adjusting apparatus 6 confirms whether the output voltage V1 is equal to Vocmin or more, and equal to Vocmax or less.

Time (2)

The adjusting apparatus 6 stops an application of the electric current to the detection section of the current detection device 3.

Time (3)

Next, the adjusting apparatus 6 adjusts the reference voltage Vref to become equal to the output voltage V1 or less.

The adjusting operation for the reference voltage Vref is performed by a zapping operation.

At this moment, the zapping operation of the zener diode will be explained with reference to FIG. 3.

Figure 3:
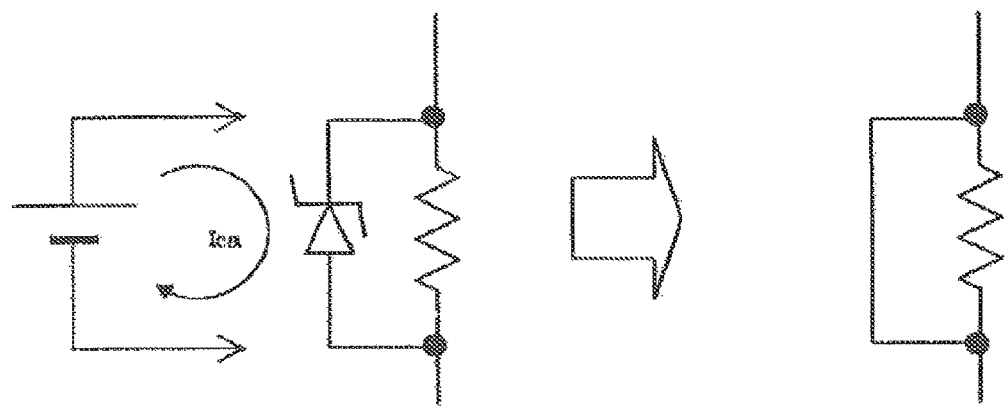
FIG. 3 is a view illustrating a zapping operation of a zener diode.

FIG. 3 is a view illustrating the zapping operation of the zener diode.

The zapping operation is performed in such a way that the resistance value between terminals is varied by means of causing a short-circuit break upon applying the reverse-bias current (Ica in FIG. 3) to the zener diode.

The adjusting apparatus 6 varies a combined resistance between both ends of the resistance value-adjusting sections 10a through 10c that are connected in series, to a desired resistance value by means of zapping the built-in zener diode in the resistance value-adjusting sections 10a, 10b and 10c.

That is, in a case of the overcurrent level generation device 4 in the present first embodiment, the reference voltage Vref of the overcurrent level generation device 4 can be lowered in a stepwise manner by varying a divided voltage ratio of the voltage by means of performing the zapping operation for each of the zener diodes of the resistance value-adjusting sections 10a, 10b, and 10c.

The adjusting apparatus 6 performs the zapping operation for an arbitrary zener diode in the respective zener diodes of the resistance value-adjusting sections 10a, 10b, and 10c.

Next, the adjusting apparatus 6 confirms whether the reference voltage Vref is smaller than the output voltage V1.

The adjusting apparatus 6 further performs the zapping operation for the zener diode when the reference voltage Vref is larger than the output voltage V1. The adjusting apparatus 6 repeats the zapping operation until the reference voltage Vref becomes smaller than the output voltage V1.

On the other hand, the adjusting apparatus 6 completes the zapping operation when the reference voltage Vref becomes smaller than the output voltage V1.

Next, the adjusting apparatus 6 confirms whether an overcurrent-detecting operation is correctly performed by means of the reference voltage Vref that is adjusted by the zapping operation.

Time (4)

Firstly, the adjusting apparatus 6 applies a maximum current value Im in a case that the overcurrent detection circuit is in a normal operating state, to the detection section of the current detection device 3.

Time (5)

The adjusting apparatus 6 confirms that the overcurrent detection signal OCT is not outputted from the overcurrent detection device 5.

Incidentally, when the overcurrent detection signal OCT is outputted at a time when the maximum current value Im is applied, the adjusting apparatus 6 releases the zapping operation, for example, for the resistance value-adjusting section 10 whose fixed resistor has a large resistance value, and performs the zapping operation for the resistance value-adjusting section 10 whose fixed resistor has a small resistance value. Thereby, the reference voltage Vref of the overcurrent level generation device 4 can be increased.

Time (6)

Thereafter, the adjusting apparatus 6 increases the electric current applied to the detection section, to form the current value Ioc. The adjusting apparatus 6 confirms that the overcurrent detection signal OCT is outputted from the overcurrent detection device 5.

The adjusting apparatus 6 completes the adjusting operation for the reference voltage Vref.

By performing the above-described operation, the abnormality judgment reference value (reference voltage Vref) is adjusted to become less than the output voltage V1 at the time when the current value Ioc is applied, and to exceed the voltage at the time when the maximum current value Im is applied.

As described above, in the present first embodiment, the reference voltage Vref is adjusted on the basis of the output at the time when the current value Ioc, from which the overcurrent is detected, is applied to the current detection device 3.

Accordingly, the error of the abnormality judgment reference value due to an initial fluctuation of the overcurrent detection circuit can be reduced.

Therefore, even when the power supply voltage or the current detection device 3 contains the initial fluctuation, a deterioration of an accuracy of the overcurrent-detecting operation can be suppressed, and an overcurrent detection circuit with high accuracy can be obtained.

Furthermore, by means of zapping the zener diode, the reference voltage Vref of the overcurrent level generation device 4 is adjusted.

Accordingly, the abnormality judgment reference value can be adjusted in a state that electronic parts are mounted on a board, and there is no need to newly add a soldering process or the like, and a cost required for the process can be suppressed.

Further, since the reference voltage Vref can be adjusted by a solid element that does not have a sliding portion, a possibility in which the resistance value is varied due to a vibration or the like after the adjusting operation is reduced, and an overcurrent detection circuit having high reliability can be obtained.

Next, an advantage accompanying an improvement of the accuracy of the abnormality judgment reference value will be explained.

In a case that the abnormality judgment reference value fluctuates, an operation range (permissible electric current range) of a product, on which the overcurrent detection circuit is mounted, is limited to the range where the operation can be performed, even when the operation range is at a lower limit value of a fluctuation range of the abnormality judgment reference value.

Hence, the improvement of the accuracy of the abnormality judgment reference value has an advantage to expand the operation range of the product on which the overcurrent detection circuit is mounted.

Furthermore, the fluctuation of the abnormality judgment reference value also causes a fluctuation in the maximum current value of the electric current flowing through the inverter 2.

On the other hand, in many cases, the product using the inverter 2 requires compensation for the operation even under a condition in which a fluctuation of the parts exists. Therefore, in order to satisfy the condition for compensating the operation, the maximum rated current of circuit elements serving as parts, and a load are designed on the basis of an upper limit of the fluctuation of the maximum current.

Hence, when the accuracy of the abnormality judgment reference value is improved, it becomes possible to reduce the rated value of the maximum current of the inverter 2 and the load. Moreover, as a result of that, a compact sizing and a cost reduction is realized.

Further, in the present first embodiment, since the load driven by means of the inverter 2 is the permanent magnet-type synchronous motor 7, the following advantage can be obtained.

Since the permanent magnet-type synchronous motor 7 generates a magnetic field by means of a magnet, a system having a good efficiency can be provided. On the other hand, when a counter-magnetizing field having a predetermined amount or more is applied to the magnet, a magnetic force is permanently lowered (demagnetization), and therefore designs of the overcurrent detection circuit and the permanent magnet-type synchronous motor 7 are made in such a way that the demagnetization is prevented.

The overcurrent detection circuit is set such that the abnormality judgment reference value is equal to a demagnetization level or less. For example, as a current value for detecting the overcurrent, a current value that does not demagnetize the magnet is set.

On the other hand, as the permanent magnet-type synchronous motor 7, it becomes necessary to secure a coercive force with a designed value or more. However, the coercive force of the permanent magnet-type synchronous motor 7 generally has a correlation with the cost, and the more the coercive force of a material is low, the more the cost is inexpensive.

Hence, when the accuracy of the abnormality judgment reference value is improved, the coercive force required for the magnet mounted in the permanent magnet-type synchronous motor 7 can be lowered, and the reduction of the cost can be realized.

Furthermore, when the load driven by means of the permanent magnet-type synchronous motor 7 is a load that drives a compressor, specifically a rotary compressor or a reciprocating compressor, the following advantage is obtained.

In the compressor, it is known that each of a suction process, a compression process, and a discharge process is transferred in synchronization with a rotational position of a rotor, and therefore a torque pulsation occurs in no small part during the rotation.

Hence, the motor current that drives the compressor rotor is increased such that a peak value is several times the effective value.

Accordingly, an operation limit of such a compressor largely relies on a relationship between the current peak value of the motor current and the abnormality judgment reference value.

That is, as described in the present first embodiment, when the fluctuation of the abnormality judgment reference value can be suppressed, and the lower limit of the range, in which the abnormality judgment reference value fluctuates, can be increased, the operation limit of the compressor is expanded, and the compressor can be operated without stopping due to the overcurrent even in a further severe driving condition. This improves a product performance.

Moreover, in a case that the load driven by the permanent magnet-type synchronous motor 7 is an air-conditioning machine using a compressor, an improvement of an air-conditioning capability is anticipated, and a big advantage is brought to the improvement of the product performance.

Incidentally, in the present first embodiment, although a case in which the overcurrent detection signal OCT is in positive logic (the overcurrent is detected at Hi level) is explained, a case of negative logic is also applicable by disposing positions of the resistance value-adjusting sections 10a, 10b, and 10c on a power supply side in relation to an output point of the reference voltage Vref.

Incidentally, in the present first embodiment, although a case in which the resistance value-adjusting section 10 is three in number is explained, the present invention is not limited thereto, and one or more arbitrary number of the resistance value-adjusting sections may be provided. As described above, by means of connecting the same in plurality in series with each other, resolution of the resistance value to be adjusted can be improved.

Further, the solid resistors connected in parallel with the zener diodes may have different resistance values, respectively. Thereby, the resolution can be improved.

Incidentally, in the present first embodiment, although a case in which the resistance value-adjusting sections 10a, 10b, and 10c are connected in series with each other is explained, the present invention is not limited thereto, and an arbitrary connection such as a parallel connection, a combination of serial and parallel connections or the like is also applicable.

Incidentally, in the present first embodiment, the operation in which the reference voltage Vref is lowered by means of the zapping operation in a case that the reference voltage Vref is larger than the output voltage V1 is explained.

The present invention is not limited thereto, and the adjustment can be made such that the reference voltage Vref is increased in a case that the reference voltage Vref is smaller than the voltage at the time when the maximum current value Im is applied.

For example, a following operation is performed in the below described construction.

In addition to the construction illustrated in the above-illustrated FIG. 1, another resistance value-adjusting section 10 is additionally connected further in series with each other. For example, three of resistance value-adjusting sections 10d, 10e, and 10f are added.

Furthermore, the adjusting apparatus 6 applies a reverse bias to the zener diode of the resistance value-adjusting sections 10d, 10e, and 10f in a normal time (initial state).

The adjusting apparatus 6 stops application of the reverse bias to the arbitrary zener diode in each of the zener diodes of the resistance value-adjusting sections 10d, 10e, and 10f when raising the reference voltage Vref.

By such an operation, the reference voltage Vref can be increased in a stepwise manner.

Hence, the abnormality judgment reference value (reference voltage Vref) can be adjusted in such a way that the abnormality judgment reference value becomes equal to or less than the output voltage V1 at the time when the current value Ioc is applied, and exceeds the voltage at the time when the maximum current value Im is applied.

Incidentally, in the present first embodiment, although a case in which the reference voltage Vref of the overcurrent level generation device 4 is adjusted is explained, the present invention is not limited thereto, and it may be applicable that the output voltage Vsens of the current detection device 3 is adjusted. For example, it is realizable to adjust the output voltage Vsens by means of a method, such as that the resistance value of the amplification circuit in the current detection device 3 is adjusted, or the like. Thereby, the same advantage as that of the present first embodiment can be obtained.

Second Embodiment

Figure 4:
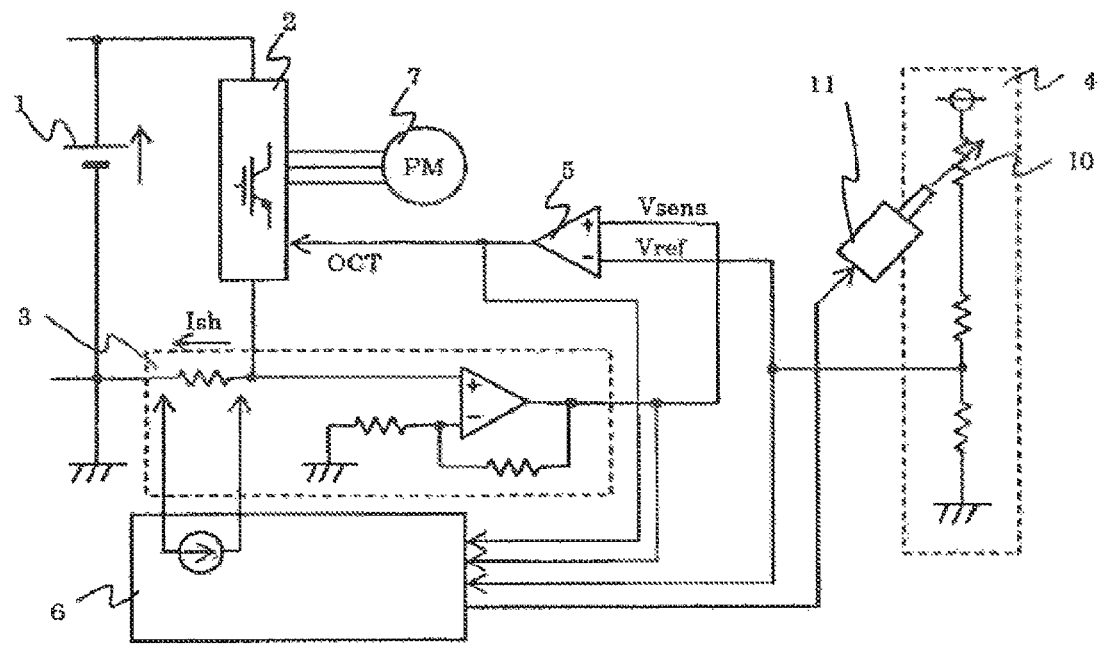
FIG. 4 is a construction view illustrating an overcurrent detection circuit according to a second embodiment of the present invention.

FIG. 4 is a construction view illustrating an overcurrent detection circuit according to the second embodiment of the present invention.

Incidentally, the same numerals are attached to the elements having the same function as that of the above-described elements in FIG. 1.

As illustrated in FIG. 4, a resistance value-adjusting section 10 in the present second embodiment is inserted between an output point of the reference voltage Vref in the overcurrent level generation device 4 and the power supply. The resistance value-adjusting section 10 is constructed with a resistor in which a resistance value varies by means of irradiation of a laser.

Further, the overcurrent level generation device 4 generates the reference voltage Vref serving as the abnormality judgment reference value in correspondence to a resistance value of the resistance value-adjusting section 10.

The adjusting apparatus 6 includes a laser apparatus 11 that radiates a laser.

The laser apparatus 11 radiates the laser in a manner so as to vary the resistance value of the resistance value-adjusting section 10.

In the present second embodiment, the reference voltage Vref is adjusted by varying the resistance value by means of irradiating the resistance value-adjusting section 10 with the laser.

Next, an adjusting operation for the reference voltage Vref of the overcurrent detection circuit in the present second embodiment will be explained using FIG. 5.

Figure 5:
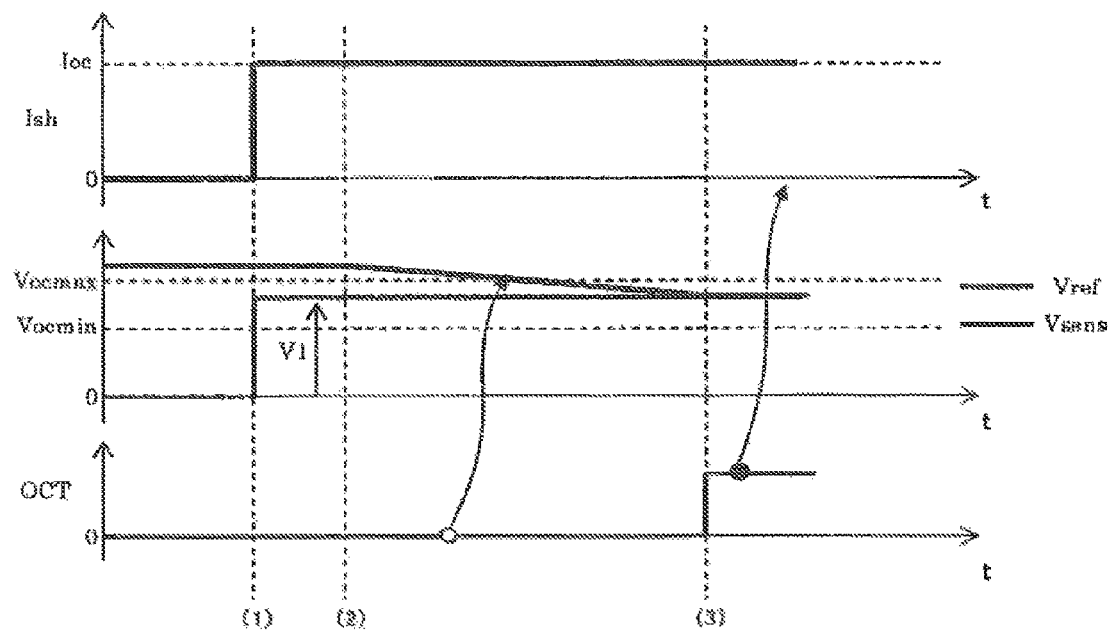
FIG. 5 is an operation-explanatory view for an overcurrent detection circuit according to the second embodiment of the present invention.

FIG. 5 is an operation-explanatory view for an overcurrent detection circuit according to the second embodiment of the present invention.

Incidentally, the same names are attached to the same signals and values as that in the above-described FIG. 2.

Hereinafter, the adjusting operation for the reference voltage Vref will be explained along a time axis in FIG. 5.

Time (1)

Firstly, the adjusting apparatus 6 applies the current value Ioc, from which the overcurrent is detected, to the detection section of the current detection device 3.

Thereafter, the adjusting apparatus 6 observes the output voltage Vsens of the current detection device 3, and obtains the output voltage V1 at the time when the current value Ioc is applied.

Further, the adjusting apparatus 6 confirms whether the output voltage V1 is within a permissible value. That is, the adjusting apparatus 6 confirms whether the output voltage V1 is equal to Vocmin or more, and equal to Vocmax or less.

Time (2)

Next, the adjusting apparatus 6 adjusts the reference voltage Vref to become less than the output voltage V1.

The adjusting operation for the reference voltage Vref is performed by laser trimming.

Currently, the laser trimming for the resistor will be explained with reference to FIG. 6.

Figure 6:
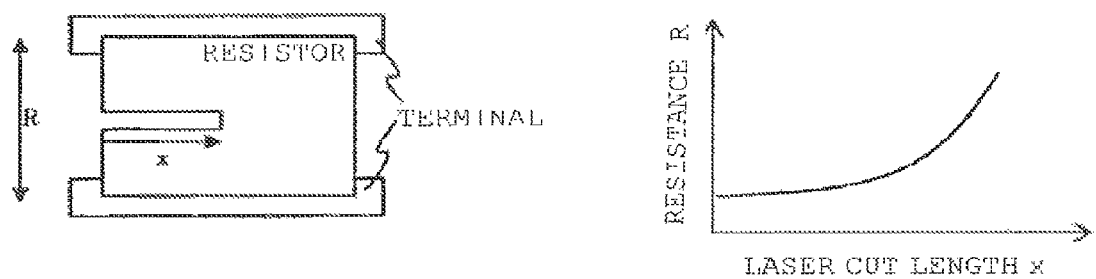
FIG. 6 is a view illustrating an example of a laser trimming for a resistor.

FIG. 6 is a view illustrating an example of the laser trimming for the resistor.

The laser trimming is a laser processing method for setting an electric characteristic with high accuracy by means of cutting a part of or entire resistor on a ceramic base with a laser beam.

As illustrated in FIG. 6, a resistance value between terminals can be increased to a desired value by means of cutting the resistor by irradiating the resistor with the laser as indicated by an arrow x.

That is, in a case of the overcurrent level generation device 4 in the present second embodiment, the divided voltage ratio of the voltage is varied by performing the laser trimming for the resistor of the resistance value-adjusting section 10, and thereby the reference voltage Vref of the overcurrent level generation device 4 can be varied.

The adjusting apparatus 6 increases the resistance value by performing the laser trimming for the resistance value-adjusting section 10.

Thereby, the reference voltage Vref of the overcurrent level generation device 4 is gradually decreased.

The adjusting apparatus 6 monitors the overcurrent detection signal OCT simultaneously with the laser trimming.

Time (3)

The adjusting apparatus 6 stops the laser irradiation from a laser apparatus 11 when the output of the overcurrent detection signal OCT is detected, and completes the adjusting operation for the reference voltage Vref.

By means of the above-described operation, the abnormality judgment reference value (reference voltage Vref) is adjusted to form an approximately the same value as the output voltage V1 at the time when the current value Ioc is applied.

As described above, in the present second embodiment, since the reference voltage Vref is adjusted on the basis of the output at the time when the current value Ioc from which the overcurrent is detected is applied to the current detection device 3, the same advantage as that of the aforementioned first embodiment can be obtained.

Further, in accordance with the present second embodiment, since the resistance value is set by means of the laser trimming, the adjusting operation for the abnormality judgment reference value can be realized with high accuracy even in a case of the board after each of the parts of the overcurrent detection circuit is mounted thereupon.

Incidentally, in the present second embodiment, the operation for decreasing the reference voltage Vref by means of the laser trimming in a case that the reference voltage Vref is larger than the output voltage V1 is explained.

The present invention is not limited thereto, and in a case that the reference voltage Vref is smaller than the output voltage V1, the reference voltage Vref can be adjusted to increase.

For example, a following operation is performed in the below described construction.

In addition to the construction in FIG. 4 illustrated above, a resistance value-adjusting section 10b including a resistor allowing the laser trimming is further added between an output point of the reference voltage Vref in the overcurrent level generation device 4 and a GND (ground). Furthermore, the adjusting apparatus 6 is further provided with a laser apparatus 11b for irradiating the resistance value-adjusting section 10b with a laser.

Moreover, the adjusting apparatus 6 increases the resistance value by means of performing the laser trimming to the resistance value-adjusting section 10b when the reference value Vref is increased.

By such an operation, the reference voltage Vref can be increased.

Incidentally, in the present second embodiment, although a case in which the reference voltage Vref of the overcurrent level generation device 4 is adjusted is explained, the present invention is not limited thereto, and the output voltage Vsens of the current detection device 3 may be adjusted.

An example of such a construction in which the output voltage Vsens of the current detection device 3 is adjusted will be explained with reference to FIG. 7.

Figure 7:
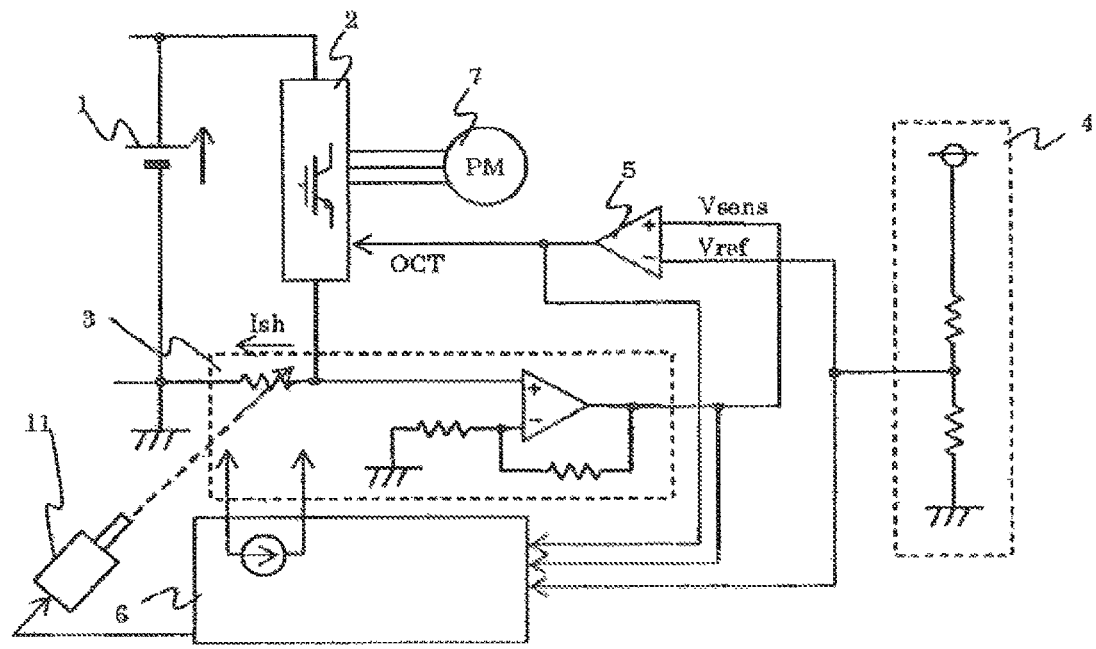
FIG. 7 is a construction view of the overcurrent detection circuit according to the second embodiment of the present invention.

FIG. 7 is a construction view of the overcurrent detection circuit according to the second embodiment of the present invention.

In FIG. 7, the detection section of the current detection device 3 is constructed with a resistor in which the resistance value varies by means of the irradiation of the laser. The adjusting apparatus 6 is provided with a laser apparatus 11 for irradiating the detection section of the current detection device 3 with the laser.

By such a construction, in the same manner as the operation described above, the current value Ioc is applied to the detection section of the current detection device 3 and the output voltage V1 is obtained.

Further, the adjusting apparatus 6 increases the resistance value of the detection section of the current detection device 3 by means of the laser trimming. Since the voltage generated in the detection section is thereby increased, the output voltage V1 of the current detection device 3 can be increased.

Even in such a construction, the output voltage V1 can be adjusted to form the approximately same voltage value as that of the reference voltage Vref.

Accordingly, the same advantage as the advantage described above can be obtained.

Third Embodiment

Figure 8:
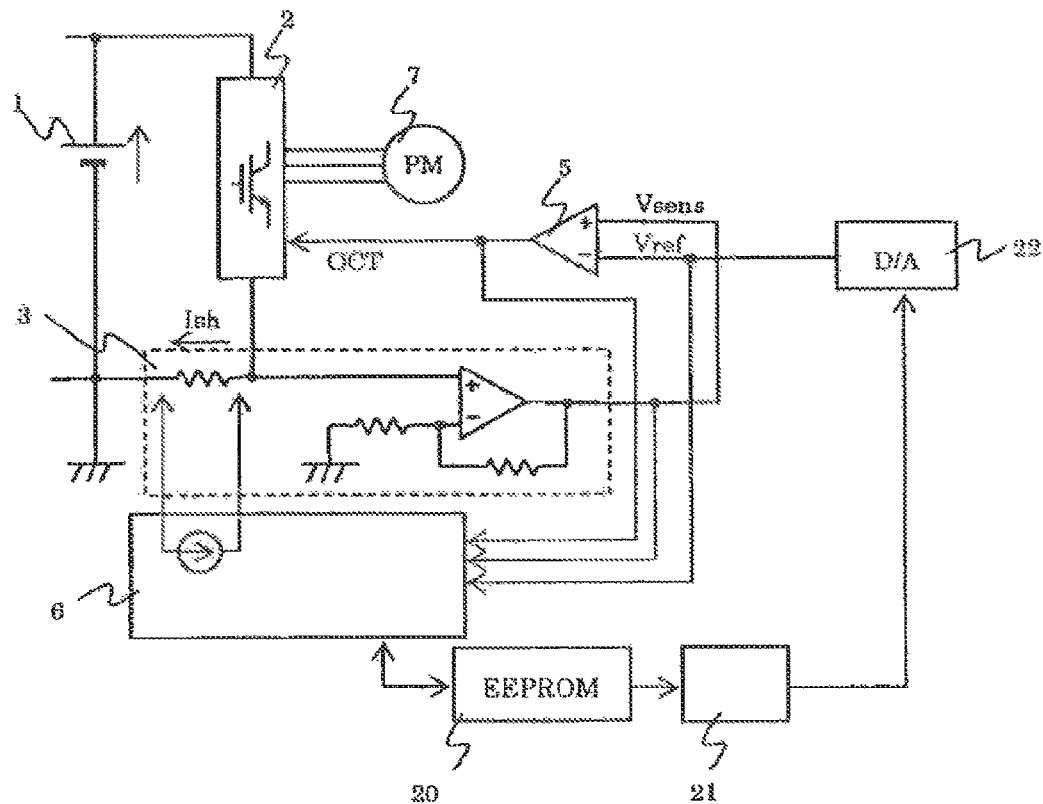
FIG. 8 is a construction view of an overcurrent detection circuit according to a third embodiment of the present invention.

FIG. 8 is a construction view of an overcurrent detection circuit according to the third embodiment of the present invention.

Incidentally, the same numerals are attached to the elements having the same function as that of the above-described elements in FIG. 1.

As illustrated in FIG. 8, an overcurrent level generation device 4 in the third embodiment includes a D/A converter circuit 22, a reader section 21, and a nonvolatile memory 20.

The nonvolatile memory 20 is constructed with, for example, an EEPROM (Electrically Erasable and Programmable Read Only Memory).

The nonvolatile memory 20 is a readable and writable storage device that stores a Vref command value outputted from the adjusting apparatus 6.

Incidentally, the Vref command value corresponds to "information regarding an abnormality judgment reference value" in the present invention.

The reader section 21 reads out the Vref command value that is stored in the nonvolatile memory 20, and outputs the Vref command value to the D/A converter circuit 22. The Vref command value outputted by the reader section 21 is a digital signal formed by, for example, an arbitrary number (n) of bits.

The D/A converter circuit 22 adjusts the voltage on the basis of a digital signal of n-bit inputted from the reader section 21 and outputs the reference voltage Vref to the overcurrent detection device 5.

Next, the adjusting operation for the reference voltage Vref of the overcurrent detection circuit in the present third embodiment will be explained using FIG. 9.

Figure 9:
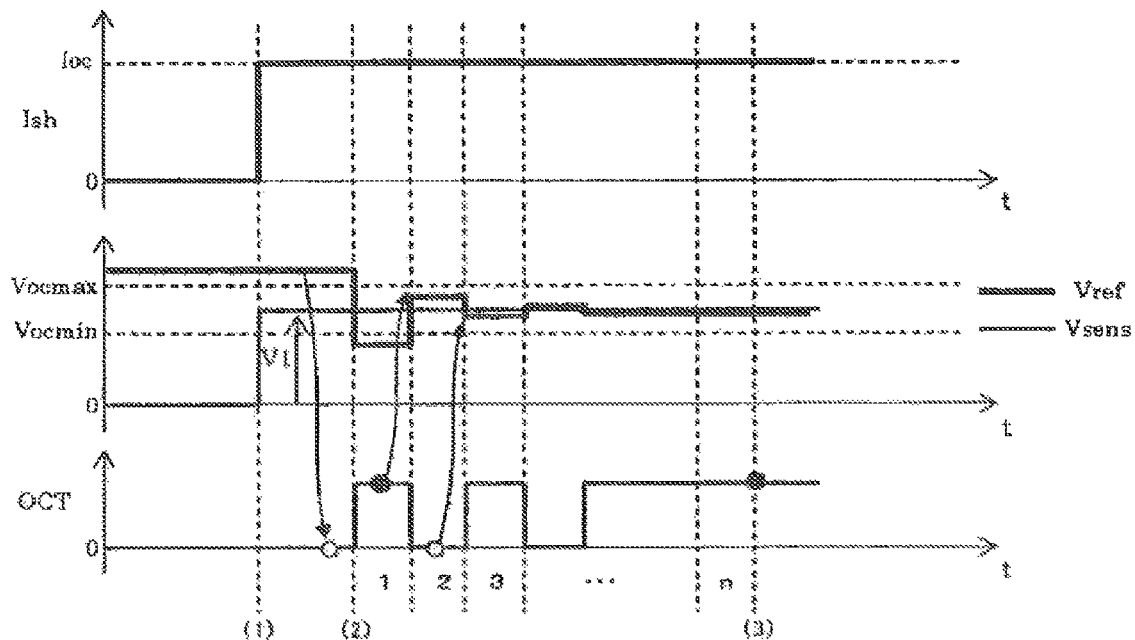
FIG. 9 is an operation-explanatory view for the overcurrent detection circuit according to the third embodiment of the present invention.

FIG. 9 is an operation-explanatory view for the overcurrent detection circuit according to the third embodiment of the present invention.

Incidentally, the same names are attached to the same signals and values as that in FIG. 2 illustrated above.

Hereinafter, the adjusting operation for the reference voltage Vref will be explained along a time axis in FIG. 9.

Time (1)

Firstly, the adjusting apparatus 6 applies the current value Ioc, from which the overcurrent is detected, to the detection section of the current detection device 3.

Thereafter, the adjusting apparatus 6 observes the output voltage Vsens of the current detection device 3, and obtains the output voltage V1 at the time when the current value Ioc is applied.

Further, the adjusting apparatus 6 confirms whether the output voltage V1 is within a permissible value. That is, the adjusting apparatus 6 confirms whether the output voltage V1 is equal to Vocmin or more, and equal to Vocmax or less.

Furthermore, the adjusting apparatus 6 writes the Vref command value corresponding to a maximum voltage value that can be generated by means of the D/A converter circuit 22 to the nonvolatile memory 20.

The reader section 21 transfers the Vref command value written to the nonvolatile memory 20 to the D/A converter circuit 22.

The D/A converter circuit 22 generates a voltage on the basis of the inputted Vref command value.

Moreover, the adjusting apparatus 6 confirms that the overcurrent detection signal OCT at this moment is Low (in a non-detection state).

Time (2)

Next, the adjusting apparatus 6 adjusts the highest bit (the bit where voltage resolution becomes maximum) of the digital signal constituting the Vref command value.

The adjusting apparatus 6 writes the Vref command value, in which the highest bit is set to 1, and all the lower bits are set to 0, to the nonvolatile memory 20.

At this moment, the adjusting apparatus 6 monitors the overcurrent detection signal OCT.

Further, if the overcurrent detection signal OCT is High (overcurrent detection), the adjusting apparatus 6 fixes the highest bit to 1, and if the overcurrent detection signal OCT is Low, the adjusting apparatus 6 fixes the highest bit to 0. Time (3)

This operation is performed n times from a higher bit of the digital signal constituting the Vref command value in sequence. Thereby, all the bits are fixed and the adjusting operation is completed.

After the adjusting operation is completed, the reference voltage Vref is fixed on the basis of a content of the nonvolatile memory 20, and is adjusted to a desired abnormality judgment reference value.

By means of the above-described operation, a bit arrangement of the Vref command value is set to output the reference voltage Vref closest to the output voltage V1.

As described above, in the present third embodiment, since the reference voltage Vref is adjusted on the basis of the output at the time when the current value Ioc, from which the overcurrent is detected, is applied to the current detection device 3, the same advantage as that of the aforementioned first embodiment can be obtained.

Furthermore, in accordance with the present third embodiment, by means of the trimming for the reference voltage Vref using the D/A converter circuit 22 and the nonvolatile memory 20, even in the case of the board on which each of the parts of the overcurrent detection circuit has been mounted, the adjusting operation for the abnormality judgment reference value can be realized with high accuracy.

Moreover, in the present third embodiment, since the readable and writable nonvolatile memory 20 and the D/A converter circuit 22 are used, there is no physical limitation in increase and decrease direction of the output voltage, and the output voltage is variable during the operation. This permits setting of the abnormality judgment reference value to be suitable for use conditions.

An example of such a setting operation for the abnormality judgment reference value to be suitable for the use conditions will be explained in a fourth embodiment.

Fourth Embodiment

Figure 10:
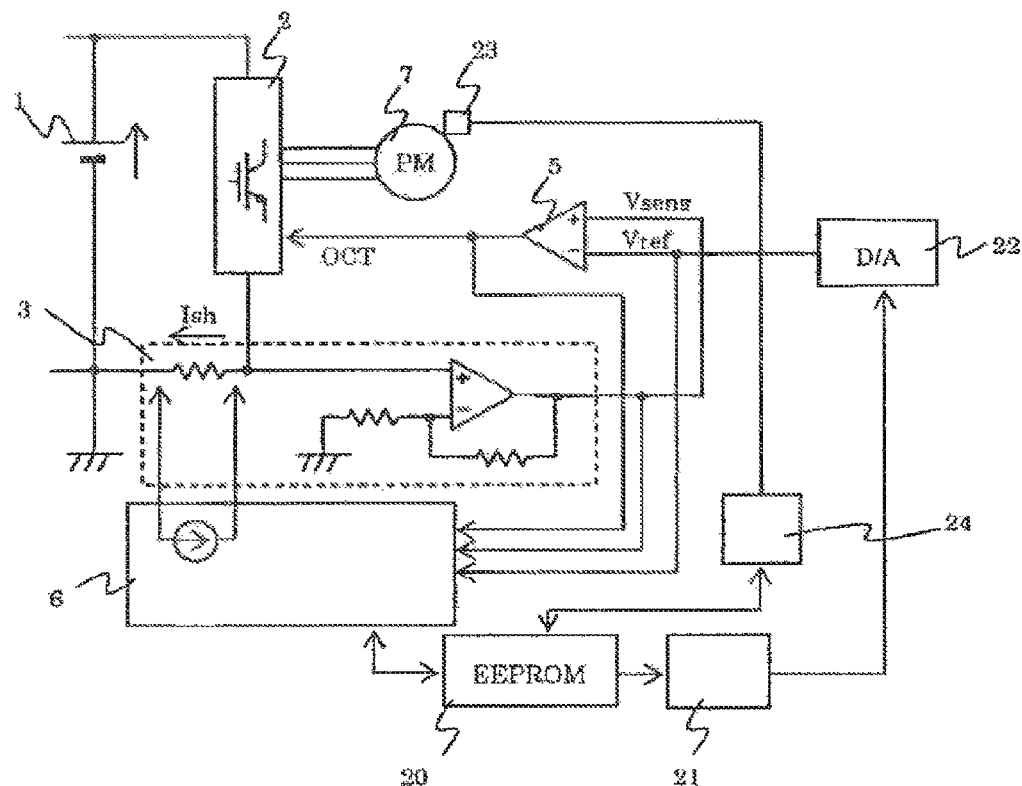
FIG. 10 is a construction view of an overcurrent detection circuit according to a fourth embodiment of the present invention.

FIG. 10 is a construction view of an overcurrent detection circuit according to the fourth embodiment of the present invention.

Incidentally, the same numerals are attached to the elements having the same function as that of the above-described elements in FIG. 8.

As illustrated in FIG. 10, an overcurrent detection circuit according to the fourth embodiment of the present invention is further provided with a temperature sensor 23 and a temperature correction device 24 in addition to the construction in the aforementioned third embodiment.

The temperature sensor 23 detects a temperature of a magnet included in the permanent magnet-type synchronous motor 7. The temperature sensor 23 notifies the detected temperature to the temperature correction device 24.

The temperature correction device 24 corrects the Vref command value in the nonvolatile memory 20 on the basis of an output of the temperature sensor 23.

The reader section 21 reads out the corrected Vref command value, and outputs it to the D/A converter circuit 22.

The D/A converter circuit 22 adjusts a voltage on the basis of the Vref command value inputted from the reader section 21, and outputs the reference voltage Vref to the overcurrent detection device 5.

Next, a correcting operation for the Vref command value in the temperature correction device 24 in the present fourth embodiment will be explained using FIG. 11.

Figure 11:
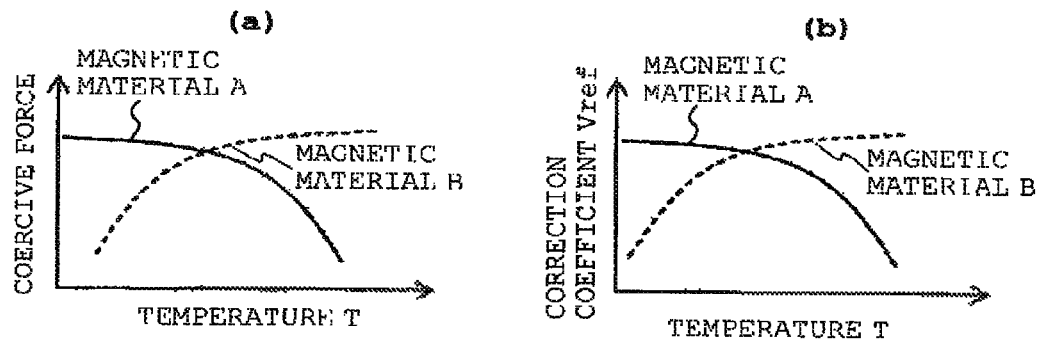
FIG. 11 is a view explaining a correcting operation for Vref according to the fourth embodiment of the present invention.

FIG. 11 is a view explaining the correcting operation for the reference voltage Vref according to the fourth embodiment of the present invention.

FIG. 11(a) illustrates a temperature characteristic of the coercive force of the magnet included in the permanent magnet-type synchronous motor 7.

FIG. 11(b) illustrates a characteristic data of the temperature and a correction coefficient of the Vref command value.

In the temperature correction device 24, the characteristic data of the temperature and the correction coefficient of the Vref command value illustrated in FIG. 11(b) are recorded.

This characteristic data can be realized, for example, by means of forming a data table or the like in accordance with the characteristic data (in FIG. 11(b)) of the temperature and the correction coefficient of the Vref command value, from the previously obtained temperature characteristic (in FIG. 11(a)) of the coercive force of the magnet included in the permanent magnet-type synchronous motor 7.

The temperature correction device 24 corrects the Vref command value on the basis of the successively detected temperature and the characteristic data during the operation of the permanent magnet-type synchronous motor 7.

By means of the above-described, an overcurrent protection circuit in correspondence to the coercive force of the magnet differing by the temperature, or the temperature characteristic of the overcurrent detection circuit can be realized.

Thereby, a high load drive in a high coercive force temperature zone, which cannot be realized in a case that the abnormality judgment reference value is constant, becomes to be applicable.

Such an operating range expanding advantage will be explained with reference to FIG. 12.

Figure 12:
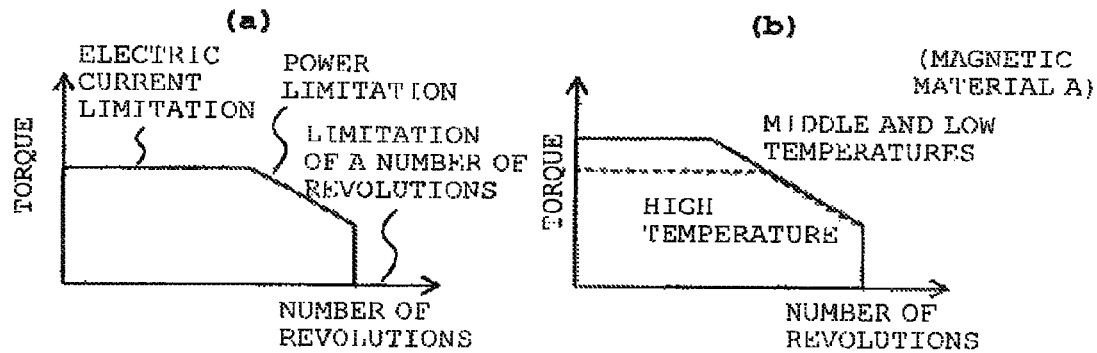
FIG. 12 is a view illustrating an operation range expanding advantage according to the fourth embodiment of the present invention.

FIG. 12 is a view illustrating an operation range expanding advantage according to the fourth embodiment of the present invention.

FIG. 12(a) illustrates the operation range in a case that the abnormality judgment reference value is constant.

FIG. 12(b) illustrates the operation rage in case that a coercive force characteristic of the permanent magnet-type synchronous motor 7 is that of a magnetic material A in FIG. 11 in the present fourth embodiment.

The magnetic material A has a coercive force that is lowered at high temperature. Therefore, according to the present fourth embodiment, a limitation with respect to the electric current can be set to be further high as far as at the time of a middle temperature and a low temperature.

Further, although the operation limit of a motor includes an electric current limitation, a power limitation, and a limitation of a number of revolutions, according to the present fourth embodiment, it is possible to expand the electric current limitation under a condition of the low temperature, and as illustrated in FIG. 12(b), the product capability can be significantly expanded.

Incidentally, in the aforementioned second through fourth embodiments, an advantage caused by performing the overcurrent detection with good accuracy is the same as that of the first embodiment, and the advantages described in the first embodiment are provided in a similar manner.

Incidentally, in the aforementioned first to fourth embodiment, the current value Ioc, from which the overcurrent is detected, is applied to the detection section of the current detection section 3, and the reference voltage Vref is adjusted on the basis of the output voltage V1 at this time. However, the present invention is not limited thereto, and it is also applicable that a predetermined constant electric current is applied to the detection section of the current detection section 3, and the reference voltage Vref is adjusted on the basis of the output at this time.

For example, it is also applicable that a constant electric current having an amount of ½ times that of the current value Ioc is applied to the detection section, and the reference voltage Vref is adjusted on the basis of the voltage value which is 2 times that of the output at this time.

As described above, by means of applying the electric current smaller than the current value Ioc, a decrease of damage of parts, or an improvement of a life can be aimed at. Further, a capacity of the constant current source included in the adjusting apparatus 6 can be reduced, and a compact sizing and a weight saving can be aimed at.

Fifth Embodiment

Next, an apparatus that significantly provides the advantage of expanding the operation range by means of the overcurrent detection circuit that is explained in the aforementioned first through fourth embodiments will be explained using FIG. 13 through FIG. 15.

Figure 13:
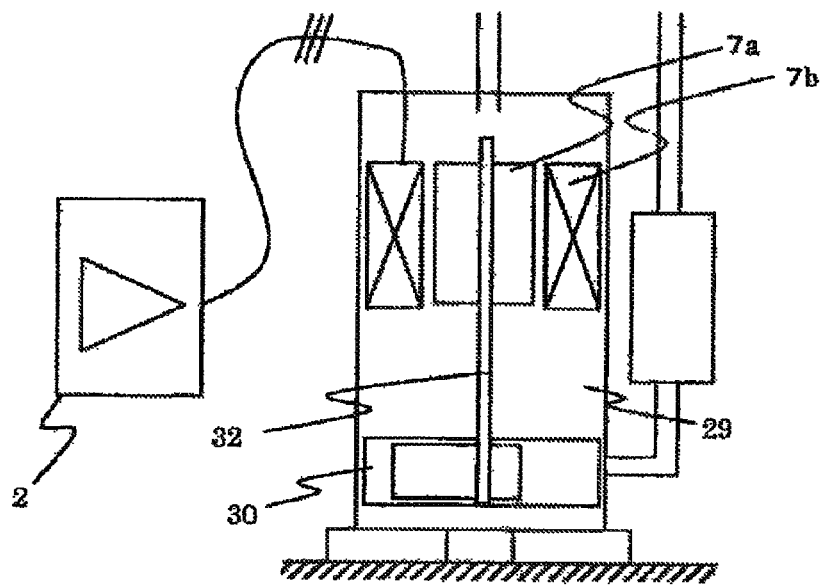
FIG. 13 is a view illustrating a structure of a compressor according to a fifth embodiment of the present invention.

FIG. 13 is a view illustrating a structure of a compressor according to a fifth embodiment of the present invention.

Figure 14:
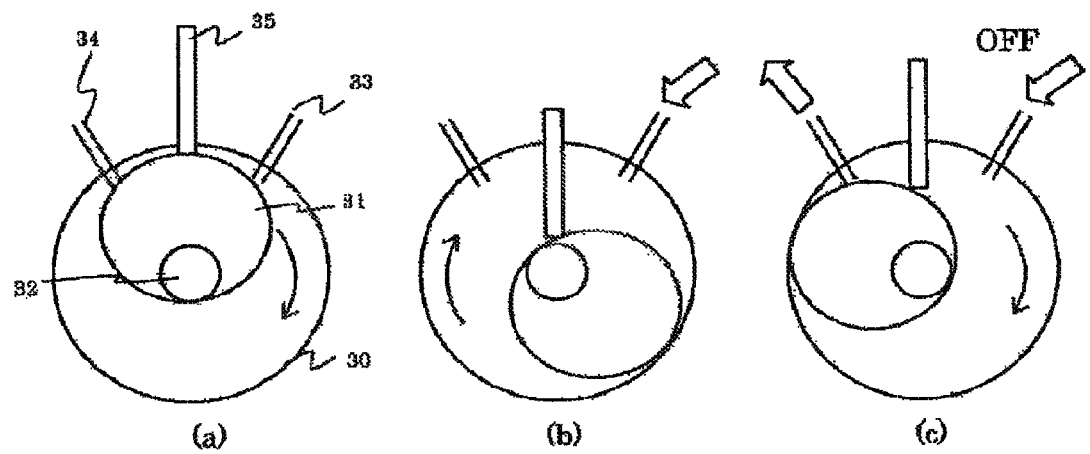
FIG. 14 is an operation-explanatory view for a single rotary compressor.

FIG. 14 is an operation-explanatory view for a single rotary compressor.

Figure 15:
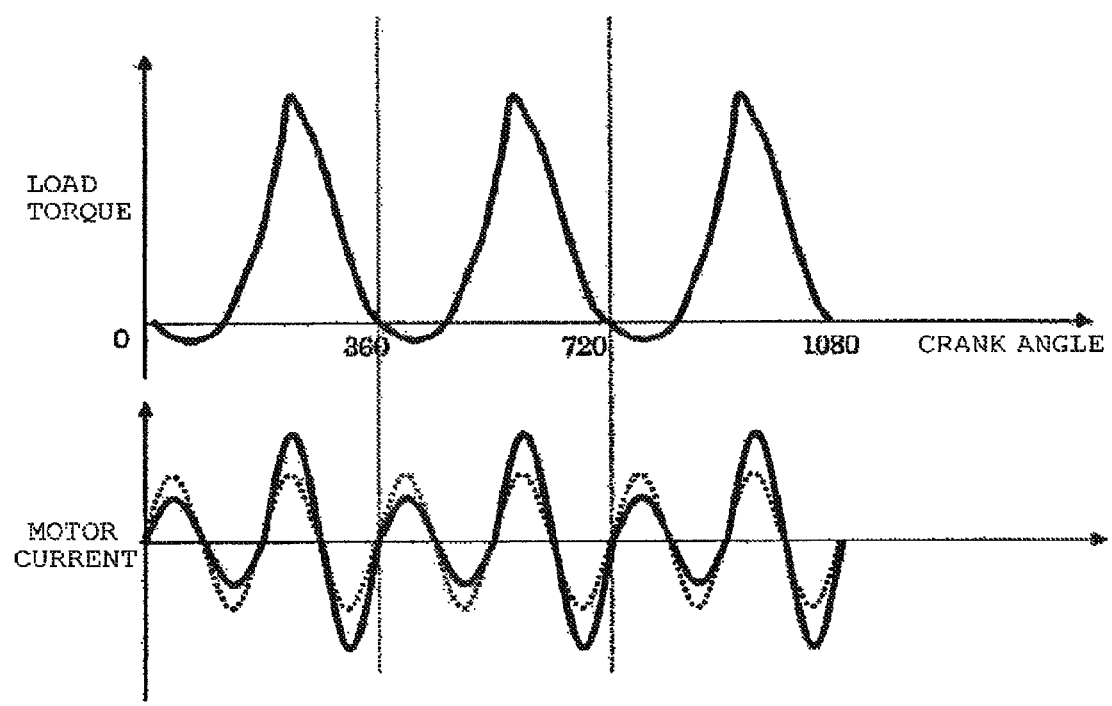
FIG. 15 is a view illustrating a load torque and a motor current of the single rotary compressor.

FIG. 15 is a view illustrating a load torque and a motor current of the single rotary compressor.

Firstly, a construction of a single rotary compressor 29 in the present fifth embodiment will be explained.

In FIG. 13, the single rotary compressor 29 is constructed with a rotor 7a and a stator 7b of the permanent magnet-type synchronous motor 7, a shaft 32 connected to the rotor 7a, and a cylinder 30 for performing a compression operation for a gas.

Furthermore, in FIG. 14, the cylinder 30 is provided with a rolling piston 31, a suction port 33, a discharge port 34, and a vane 35 serving as a partition wall between the suction port 33 and the discharge port 34.

Currently, a voltage is applied to the permanent magnet-type synchronous motor 7 from the inverter 2, and the permanent magnet-type synchronous motor 7 rotates the rotor 7a, and performs the compression operation via the shaft 32.

Next, the compression operation of the single rotary compressor will be explained using FIG. 14.

The rolling piston 31 is transferred in the order of FIGS. 14(a), (b), (c), and (a) while rotating by means of the permanent magnet-type synchronous motor 7. By means of such a transition of the rolling piston 31, a suction, a compression, and a discharge of the gas is performed.

At this moment, torque applied to the shaft 32 is increased along the way where the gas is compressed, and decreased along the way where the gas is discharged.

Such a torque variation of the torque applied to the shaft 32 is indicated in FIG. 15.

A load torque of the permanent magnet-type synchronous motor 7 (four-pole motor in the present fifth embodiment) varies in correspondence to a rotation angle (crank angle) of the compressor.

Moreover, since the load torque is applied to the permanent magnet-type synchronous motor 7 through the shaft 32, a pulsation of the electric current occurs in correspondence to the load torque.

In the single rotary compressor 29, the electric current pulsation occurs by the reason of a principle as described above.

Such an electric current pulsation causes an increase of a current peak value, and as a result, the permanent magnet-type synchronous motor 7 and the inverter 2 having a high abnormality judgment reference value are specifically needed.

Therefore, a compact sizing and a cost reduction of the permanent magnet-type synchronous motor 7 and the inverter 2 can be realized by means of using the overcurrent detection circuit described in the first through fourth embodiments described above, in the inverter 2 that drives the single rotary compressor 29.

Sixth Embodiment

Figure 16:
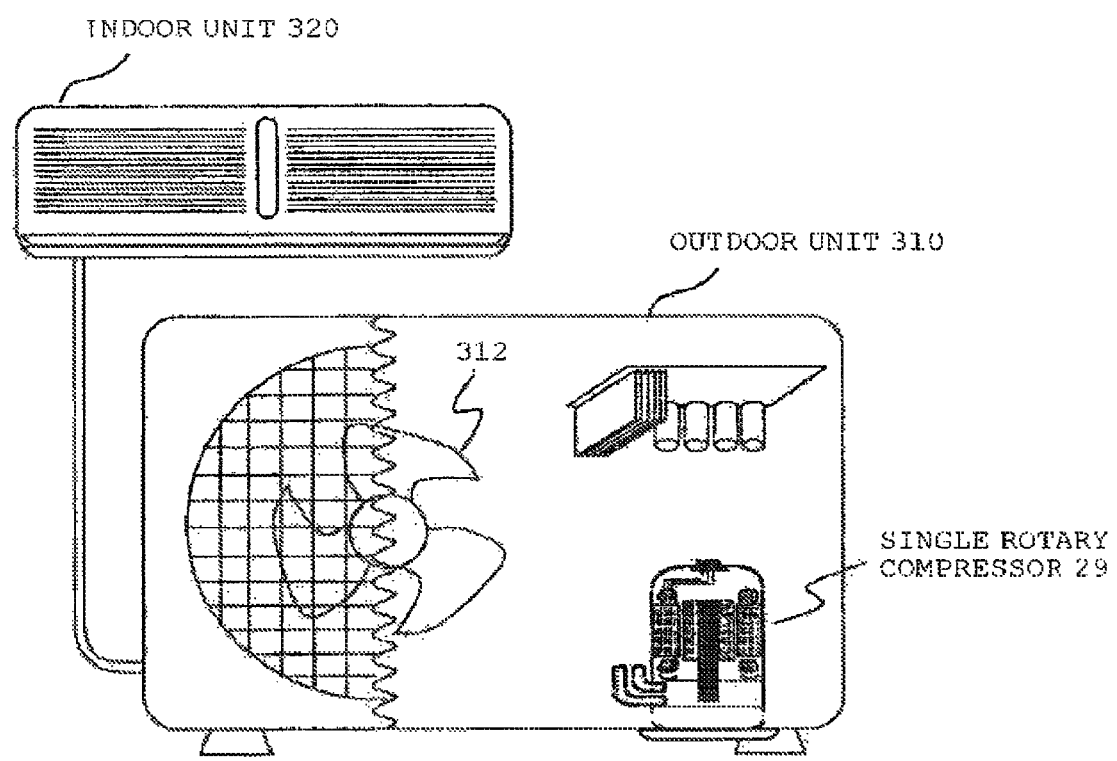
FIG. 16 is a view illustrating a construction of an air-conditioning machine according to a sixth embodiment of the present invention.

FIG. 16 is a view illustrating a construction of an air-conditioning machine according to a sixth embodiment of the present invention.

In FIG. 16, the air-conditioning machine in the present sixth embodiment is provided with an outdoor unit 310 and an indoor unit 320, and the outdoor unit 310 is provided with the single rotary compressor 29 being connected to a not-illustrated refrigerant circuit and constituting a refrigeration cycle, and an air-blower 312 for use in the outdoor unit for blowing air to a not-illustrated heat exchanger.

Further, the single rotary compressor 29 is driven by means of the permanent magnet-type synchronous motor 7 in the above-described first to fifth embodiments. Furthermore, the permanent magnet-type synchronous motor 7 is driven by means of the inverter 2 on which the overcurrent detection circuit in the above-described first to fifth embodiments is mounted.

By means of such a construction, the same advantage as that in the aforementioned first to fifth embodiments can be obtained.

INDUSTRIAL APPLICABILITY

As an application example of the present invention, the present invention is widely utilizable for a load that performs power consumption by a direct current.

Specifically, since the operation range is expanded by means of applying the present invention to the inverter that drives the permanent magnet-type synchronous motor, and a compact sizing and a cost reduction can be aimed in the circuit and the load, the present invention can be applied to all the home electric appliances, such as a refrigerator, a dehumidifier, a heat pump water heater, a showcase, a cleaner, or the like other than an air-conditioning machine, a freezer, and a washer and dryer, and at the same time, the present invention can also be applied to a fan motor, a ventilation fan, a hand dryer, and so forth.

The invention claimed is:
1. An overcurrent detection circuit comprising:
   a current detection device connected between a direct-current power source and an inverter in series therewith, for detecting an electric current flowing through the inverter;
   an overcurrent level generation device for generating an abnormality judgment reference value;

an overcurrent detection device for generating an interruption signal to the inverter on the basis of an output of the current detection device and the abnormality judgment reference value; and an adjusting apparatus for correcting the abnormality judgment reference value of the overcurrent level generation device on the basis of the output at a time when a constant electric current is applied to the current detection device, wherein the overcurrent level generation device includes one or a plurality of resistance value adjusting sections having a fixed resistor and a zener diode connected to the fixed resistor in parallel therewith, and generates the abnormality judgment reference value in correspondence to a resistance value of the resistance value adjusting section, wherein the adjusting apparatus performs a zapping operation by means of applying a reverse-bias to the zener diode, and corrects the abnormality judgment reference value so that the abnormality judgment reference value becomes equal to or less than the output at the time when the current, from which the overcurrent is detected, is applied to the current detection device, and exceeds the output at the time when the current, from which a maximum current in a normal state is detected, is applied to the current detection device, and wherein the overcurrent detection device outputs the interruption signal when the output of the current detection device becomes equal to or more than the abnormality judgment reference value.

2. An overcurrent detection circuit comprising:

a current detection device connected between a direct-current power source and an inverter in series therewith, for detecting an electric current flowing through the inverter;

an overcurrent level generation device for generating an abnormality judgment reference value;

an overcurrent detection device for generating an interruption signal to the inverter on the basis of an output of the current detection device and the abnormality judgment reference value; and an adjusting apparatus for correcting the abnormality judgment reference value of the overcurrent level generation device on the basis of the output at a time when a constant electric current is applied to the current detection device, wherein the overcurrent level generation device includes a resistor whose resistance value varies by means of a laser irradiation, and generates the abnormality judgment reference value in correspondence to the resistance value of the resistor, wherein the adjusting apparatus includes a laser apparatus for radiating the laser, and corrects the abnormality judgment reference value so that the abnormality judgment reference value becomes equal to or less than the output at the time when the current, from which the overcurrent is detected, is applied to the current detection device, and exceeds the output at the time when the current, from which a maximum current in a normal state is detected, is applied to the current detection device by means of varying the resistance value upon irradiating the resistor with the laser, and wherein the overcurrent detection device outputs the interruption signal when the output of the current detection device becomes equal to or more than the abnormality judgment reference value.

3. An overcurrent detection circuit comprising:

a current detection device connected between a direct-current power source and an inverter in series therewith, for detecting an electric current flowing through the inverter;

an overcurrent level generation device for generating an abnormality judgment reference value;

an overcurrent detection device generating an interruption signal to the inverter on the basis of an output of the current detection device and the abnormality judgment reference value; and an adjusting apparatus for correcting the abnormality judgment reference value of the overcurrent level generation device on the basis of the output at a time when a constant electric current is applied to the current detection device, wherein the overcurrent level generation device includes a storage device in which information regarding the abnormality judgment reference value is stored, and a D/A converter circuit for generating the abnormality judgment reference value on the basis of the information stored in the storage device, wherein the adjusting apparatus corrects the abnormality judgment reference value so that the abnormality judgment reference value becomes equal to or less than the output at the time when the current, from which the overcurrent is detected, is applied to the current detection device, and exceeds the output at the time when the current, from which a maximum current in a normal state is detected, is applied to the current detection device by means of varying the information regarding the abnormality judgment reference value stored in the storage device, and wherein the overcurrent detection device outputs the interruption signal when the output of the current detection device becomes equal to or more than the abnormality judgment reference value.

4. An overcurrent detection circuit comprising:

a current detection device connected between a direct-current power source and an inverter in series therewith, and detecting an electric current flowing through the inverter;

an overcurrent level generation device for generating an abnormality judgment reference value;

an overcurrent detection device generating an interruption signal to the inverter on the basis of an output of the current detection device and the abnormality judgment reference value; and an adjusting apparatus for correcting the output of the current detection device on the basis of the output at a time when a constant electric current is applied to the current detection device, wherein the current detection device includes a resistor whose resistance value varies by means of a laser irradiation, and detects an electric current flowing through the inverter in correspondence to the resistance value of the resistor, wherein the adjusting apparatus includes a laser apparatus for radiating a laser, and corrects the output of the current detection device so that the abnormality judgment reference value becomes equal to or less than the output at the time when the current, from which the overcurrent is detected, is applied to the current detection device, and exceeds the output at the time when the current, from which a maximum current in a normal state is detected, is applied to the current detection device by means of varying the resistance value upon irradiating the resistor with the laser, and wherein the overcurrent detection device outputs the interruption signal when the output of the current detection device becomes equal to or more than the abnormality judgment reference value.

5. The overcurrent detection circuit according to claim 1, wherein the current value of the constant electric current applied to the current detection device is a current value, from which the overcurrent is detected.

6. The overcurrent detection circuit according to claim 1, wherein a load driven by means of the inverter is a permanent magnet-type synchronous motor, and a current value of the constant electric current applied to the current detection device is a current value that does not demagnetize the magnet included by the permanent magnet-type synchronous motor.

7. The overcurrent detection circuit according to claim 1, further comprising:
- a temperature sensor for detecting a temperature of the magnet included by the permanent magnet-type synchronous motor driven by means of the inverter; and
- a temperature correction device for correcting the abnormality judgment reference value on the basis of the temperature of the magnet.

8. An inverter on which the overcurrent detection circuit according to claim 1 is mounted.

9. A compressor comprising:
an inverter according to claim 8; and
an electric motor driven by means of the inverter.

10. An air-conditioning machine comprising:
an inverter according to claim 8;
an electric motor driven by means of the inverter; and
a compressor driven by means of the electric motor.

11. An adjusting method for adjusting an overcurrent detection circuit for adjusting an abnormality judgment reference value comprising: a current detection device for detecting an electric current flowing through an inverter, an overcurrent level generation device for generating an abnormality judgment reference value, and an overcurrent detection device for generating an interruption signal to the inverter when an output of the current detection device becomes equal to or greater than the abnormality judgment reference value, wherein there are provided the steps of:
- applying a predetermined electric current to the current detection device;
- detecting the output of the current detection device; and
- adjusting the abnormality judgment reference value so that the abnormality judgment reference value becomes equal to or less than the output at the time when the current, from which the overcurrent is detected, is applied to the current detection device, and exceeds the output at the time when the current, from which a maximum current in a normal state is detected, is applied to the current detection device by varying the resistance value of the overcurrent level generation device on the basis of the detected output.

12. An adjusting method for adjusting an overcurrent detection circuit for adjusting an abnormality judgment reference value comprising: a current detection device for detecting an electric current flowing through an inverter, an overcurrent level generation device for generating an abnormality judgment reference value, and an overcurrent detection device for generating an interruption signal to the inverter when an output of the current detection device becomes equal to or greater than the abnormality judgment reference value, wherein there are provided the steps of:
- applying a predetermined electric current to the current detection device;
- detecting the output of the current detection device;
- adjusting the abnormality judgment reference value so that the abnormality judgment reference value becomes equal to or less than the output at the time when the current, from which the overcurrent is detected, is applied to the current detection device, and exceeds the output at the time when the current, from which a maximum current in a normal state is detected, is applied to the current detection device by varying the resistance value of the overcurrent level generation device on the basis of the detected output; and
- repeating the steps from the applying step up to the adjusting step, upon varying a current value of the predetermined electric current.

* * * * *